United States Patent
Liao

(10) Patent No.: US 9,601,791 B2
(45) Date of Patent: Mar. 21, 2017

(54) INTAKE CIRCULATORY SYSTEM FOR ZINC AIR FUEL CELL

(71) Applicant: Wen Huang Liao, Taipei (TW)

(72) Inventor: Wen Huang Liao, Taipei (TW)

( * ) Notice: Subject to any disclaimer, the term of this patent is extended or adjusted under 35 U.S.C. 154(b) by 259 days.

(21) Appl. No.: 14/584,543

(22) Filed: Dec. 29, 2014

(65) Prior Publication Data

US 2016/0190623 A1  Jun. 30, 2016

(51) Int. Cl.
| | |
|---|---|
| H01M 8/06 | (2016.01) |
| H01M 8/04 | (2016.01) |
| H01M 12/08 | (2006.01) |
| H01M 10/42 | (2006.01) |
| H01M 10/46 | (2006.01) |
| H01M 2/02 | (2006.01) |
| H01M 8/18 | (2006.01) |

(52) U.S. Cl.
CPC ....... *H01M 8/0656* (2013.01); *H01M 2/0255* (2013.01); *H01M 12/08* (2013.01); *H01M 8/04201* (2013.01); *H01M 8/188* (2013.01); *H01M 10/4214* (2013.01)

(58) Field of Classification Search
CPC ............. H01M 10/4214; H01M 12/08; H01M 2/0255; H01M 8/04201; H01M 8/0656; H01M 8/188

See application file for complete search history.

Primary Examiner — Carlos Barcena
(74) Attorney, Agent, or Firm — Rabin & Berdo, P.C.

(57) ABSTRACT

The present invention provides an intake circulatory system for a zinc air fuel cell, including a housing, a zinc air cell, an air supply system and an air collecting system. The housing is partitioned on the inside of the intake circulatory system for a zinc air fuel cell to form a first space and a second space. The zinc air cell is assembled on the inside of the housing, and includes a discharging region that is located in the first space and a charging region that is located in the second space. Moreover, the air supply system includes an air supply device and an air intake device that is in connection with the air supply device and the first space. In addition, the air collecting system includes an air collecting device that is in connection with the air intake device, and at least one air output pipe exists in between the air collecting device and the second space. Further, in accordance with the present invention, the air supply device transmits external air to the first space via the air intake device. The discharging region of the zinc air cell has a chemical reaction with oxygen from the external air to generate electricity. The charging region produces oxygen by generating electricity to perform a reduction reaction. The air collecting device absorbs oxygen and also transmits the oxygen to the air intake device. The external air and the oxygen are mixed and subsequently enter the first space. As such, the power supply efficiency of the discharging region is increased in accordance with the present invention.

8 Claims, 6 Drawing Sheets

INTAKE CIRCULATORY SYSTEM FOR ZINC AIR FUEL CELL

FIELD OF THE INVENTION

The present invention relates generally to a circulatory system for a fuel cell, and more particularly, the present invention relates to a circulatory system that may enable a zinc air fuel cell to produce oxygen by performing a reduction reaction, and subsequently enabling the zinc air fuel cell to generate electricity by performing a chemical reaction.

BACKGROUND OF THE INVENTION

The types of cells can be classified into two main types, and these are chemical cells and physical cells. Chemical cells can be further classified into three types such as primary cell, secondary cell and fuel cell, whereby the main characteristics of a fuel cell are that a fuel cell has a positive electrode as well as a negative electrode, and active substances are not present in the fuel cell. In addition, active materials need to be supplied externally and continuously to the fuel cell, so as to enable the fuel cell to be discharged continuously. As such, in order to produce electricity continuously, the positive electrode (the cathode) of the fuel cell need to carry out an oxidation reaction with oxygen from the external air.

Among all of the cell types of fuel cells, nowadays the zinc air cell may provide a high energy density on the basis of all of the electrolyte-based cells. Besides being reliable and safe, the other advantages of zinc air cells include having low costs of manufacture, being easily recycled, and having low pollution rates.

FIG. 1 shows the structure of a conventional zinc air cell 1. The conventional zinc air cell 1 may be mainly made up of a zinc anode plate 10 and a cathode plate 11. The zinc anode 10 may perform the function of the negative electrode (anode), and at the same time may perform the function of a fuel cell of the zinc air cell 1. In the conventional zinc air cell 1, the oxygen from the external air 12 may act as the depolarizing agent of the hydrogen atoms. The external air 12 may diffuse and enter the structure of the conventional zinc air cell 1 via the side of the cathode plate 11, to enable the zinc anode plate 10 to have a chemical reaction with oxygen from the external air and thus produces electricity.

However, since the external air only contains 21% of oxygen, as such, if the generation of electricity is only by means of chemical changes, the power supply efficiency of the conventional zinc air cell 1 would be very limited. Further, electricity generation by means of chemical changes cannot be used for a long time, to gradually increase the power supply efficiency of the conventional zinc air cell 1.

In view of the above, there are still limitations on the practical uses of the conventional zinc air cell 1, and that there is still a need to have an improvement on the conventional zinc air cell 1. The improvement of the conventional zinc air cell may be achieved by the creation of a type of zinc air cell that may be used in the long term, so as to gradually increase the power supply efficiency of the circulatory system for the zinc air cell.

SUMMARY OF THE INVENTION

The main objective of the present invention involves the collection of pure oxygen that is produced by a reduction reaction of the zinc air fuel cell, and the pure oxygen is supplied to the oxidation reaction region, so as to increase the power supply efficiency of the zinc air fuel cell.

The other objective of the present invention is that the zinc air fuel cell involves a tubular design and the zinc electrode may be in a flowable state. Upon being operated on and being driven, the flow of the zinc electrode may be changed; and the zinc electrode that has not undergone the chemical reaction may significantly increase the ratio of the total surface area with oxygen, and thus increasing the discharging efficiency of the fuel cell.

In order to achieve the aforesaid objective, the intake circulatory system for a zinc air fuel cell of the present invention includes: a housing, a zinc air cell, an air supply system, an air collecting system, a power supply device, a temperature difference engine and a shifting device. The inside of the housing is partitioned into a first space and a second space.

In accordance with a preferred exemplary embodiment of the present invention, the zinc air cell may be assembled on the inside of the housing. The zinc air cell may include a discharging region located in the first space, and a charging region located in the second space, whereby the zinc air cell may be mainly constituted by a zinc electrode, a metal collecting electricity grid, an insulating film, an air electrode, an outer cover and a metal mesh.

In one preferred exemplary embodiment, the zinc electrode may show a slurry in a flowable state. The metal collecting electricity grid may encapsulate the outside of the zinc electrode; the insulating film may encapsulate the outside of the metal collecting electricity grid; the air electrode may encapsulate the outside of the insulating film; and the outer cover may encapsulate the outside of the air electrode, and may have a plurality of through holes; the metal mesh may be located in the second space of the housing, and may also encapsulate the outside of the outer cover.

The air supply system may include an air supply device and an air intake device that is in connection with the air supply device and the first space. In addition, the air intake device may include a first air intake pipe that is in connection with the air supply device and the first space of the housing. Moreover, the air intake device may also include a second air intake pipe that is in connection with the first air intake pipe, as well as including a third air intake pipe that is in connection with the first air intake pipe.

In one preferred exemplary embodiment, the air collecting system may include an air intake device that is in connection with the second air intake pipe, and at least one air output pipe may exist in between the air collecting device and the second space. The power supply device may be assembled on the metal mesh of the zinc air cell, and transmits electricity to the metal mesh.

The temperature difference engine may be in connection with the third air intake pipe, whereby the air supply device may transmit the external air to the temperature difference engine via the third air intake pipe. The temperature of the external air within the first space may be increased by means of a chemical reaction. The external air with the increased temperature may be transmitted to the temperature difference engine via a second air output pipe, and the temperature difference engine may be driven by a difference in temperature between the external air within the third air intake pipe and the external air within the second output pipe.

In accordance with a preferred exemplary embodiment of the present invention, the shifting device may be assembled in between the charging region and the discharging region of the zinc air cell, and may drive the flow of the zinc electrode of the zinc air cell in the metal collecting electricity grid.

In accordance with a preferred exemplary embodiment of the present invention, the air supply device may firstly absorb external air, and then may transmit the external air to the first space via the air intake device. This arrangement may enable the discharging region of the zinc air cell to have a chemical reaction with oxygen from the external air to generate electricity. In addition, the power supply device may transmit electricity to the charging region, so as to enable the charging region to generate electricity to perform a reduction reaction and to produce oxygen. The air collecting device may absorb oxygen and may transmit the oxygen to the air intake device, so as to enable the external air and the oxygen to be mixed and enter the first space, and thus enabling the power supply efficiency of the discharging region to be increased.

In accordance with a preferred exemplary embodiment of the present invention, the metal mesh may have a hollow metal rod piece within the zinc air cell. When the zinc air cell performs the reduction reaction to produce the oxygen by generating electricity in the power supply device, the oxygen may be transmitted to the outside of the zinc air cell via the inside of the hollow metal rod piece.

The special distinguishing technical feature of the present invention may involve the transmission of external air to the first space of the housing by the air supply device, via the first air intake pipe of the air intake device. This may enable the discharging region of the zinc air cell to have a chemical reaction with the oxygen from the external air, and therefore generating electricity. Moreover, the power supply device may transmit the electricity to the discharging region of the zinc air cell, to enable the charging region to generate electricity and perform a reduction reaction as well as producing oxygen. The air collecting device may absorb oxygen and transmits the oxygen to the air intake device, to enable the external air and the oxygen to be mixed and enter the first space, and thus enabling the power supply efficiency of the discharging region to be increased.

BRIEF DESCRIPTION OF THE DRAWINGS

The present invention can be understood in more detail by reading the subsequent detailed description in conjunction with the examples and preferred exemplary embodiments made to the accompanying drawings, wherein.

DETAILED DESCRIPTION OF THE PREFERRED EMBODIMENT

The accompanying drawings are included to provide a further understanding of the invention, and are incorporated in and constitute a part of this specification. The drawings illustrate the preferred exemplary embodiments of the invention and, together with the description, serve to explain the principles of the invention.

Figure 1:
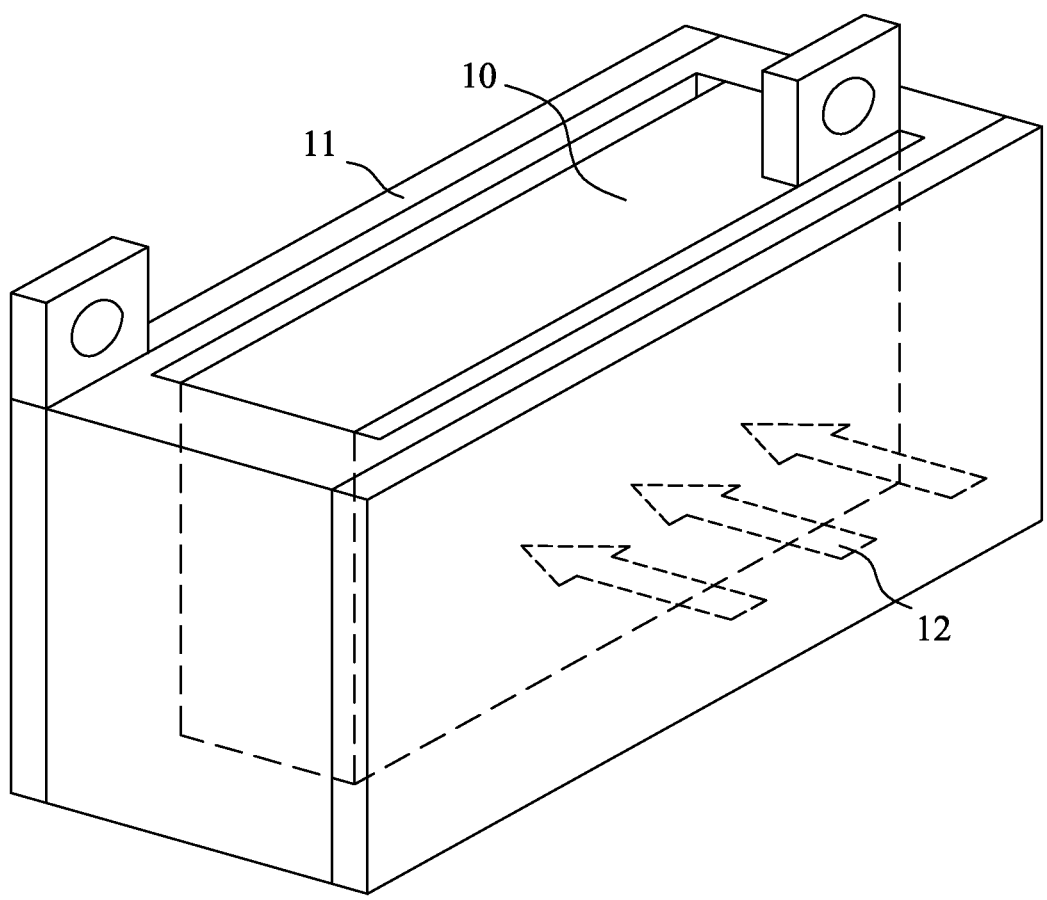
FIG. 1 is a schematic diagram of a conventional zinc air cell.
Figure 2:
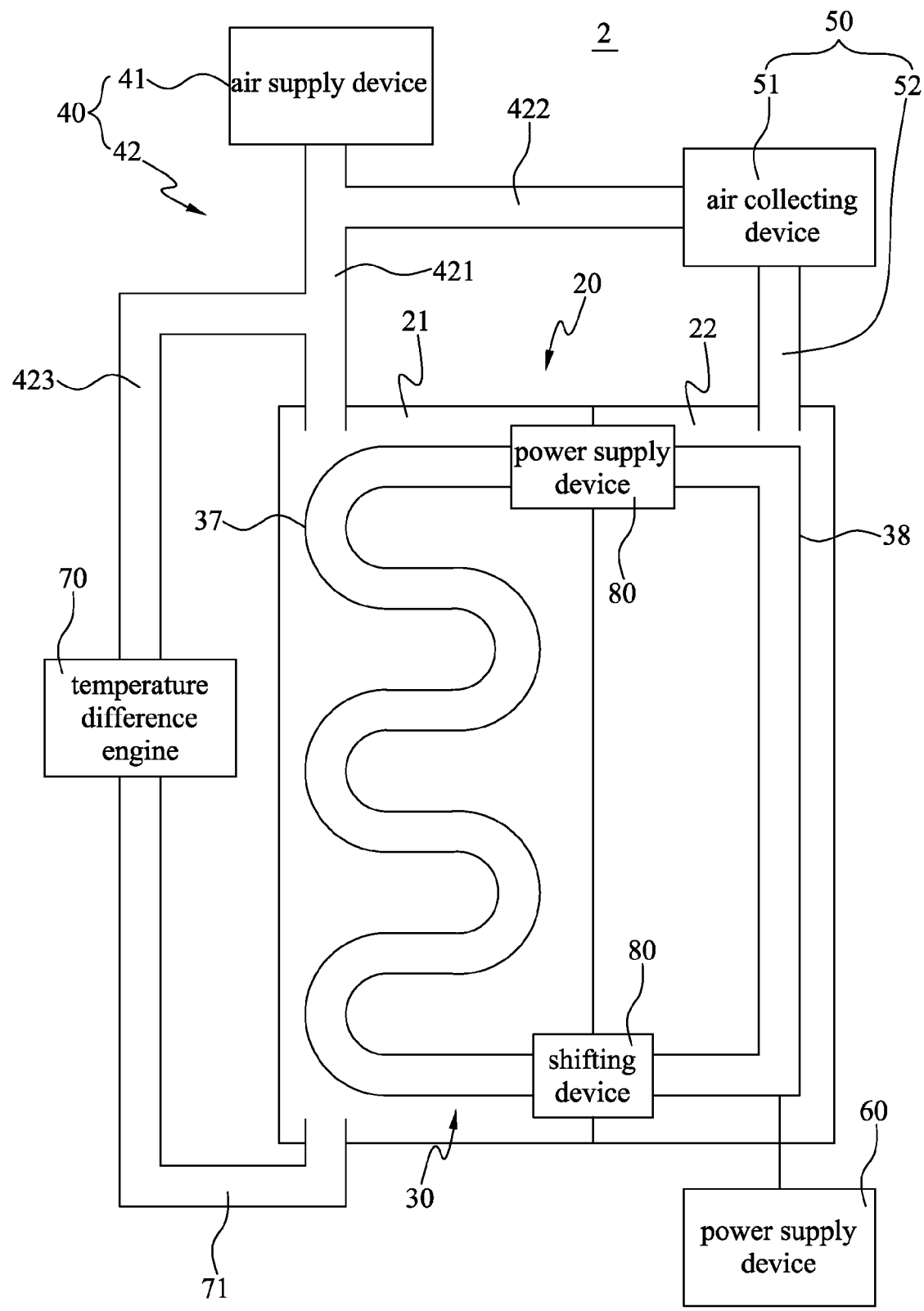
FIG. 2 is a schematic diagram illustrating an intake circulatory system for a zinc air fuel cell in accordance with a preferred exemplary embodiment of the present invention.
Figure 3:
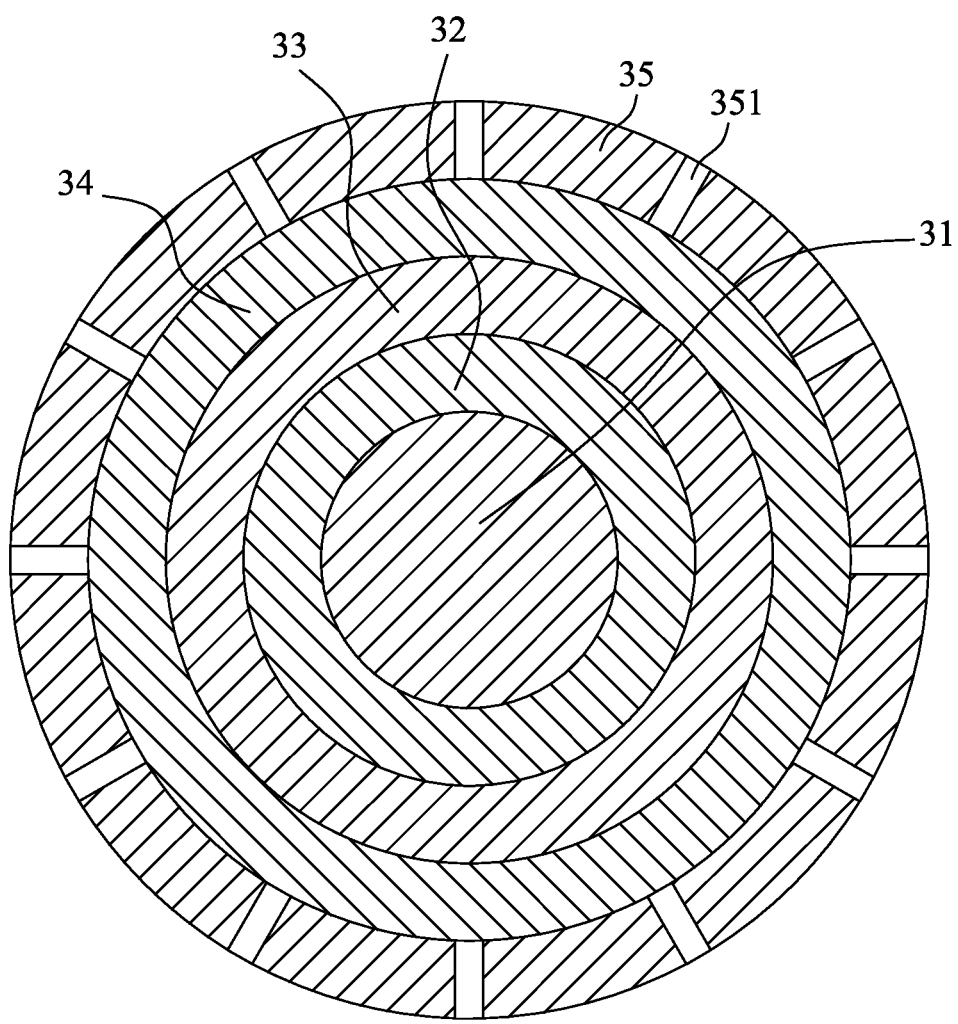
FIG. 3 is a cross-sectional view of the zinc air fuel cell in accordance with a preferred exemplary embodiment of the present invention.
Figure 4:
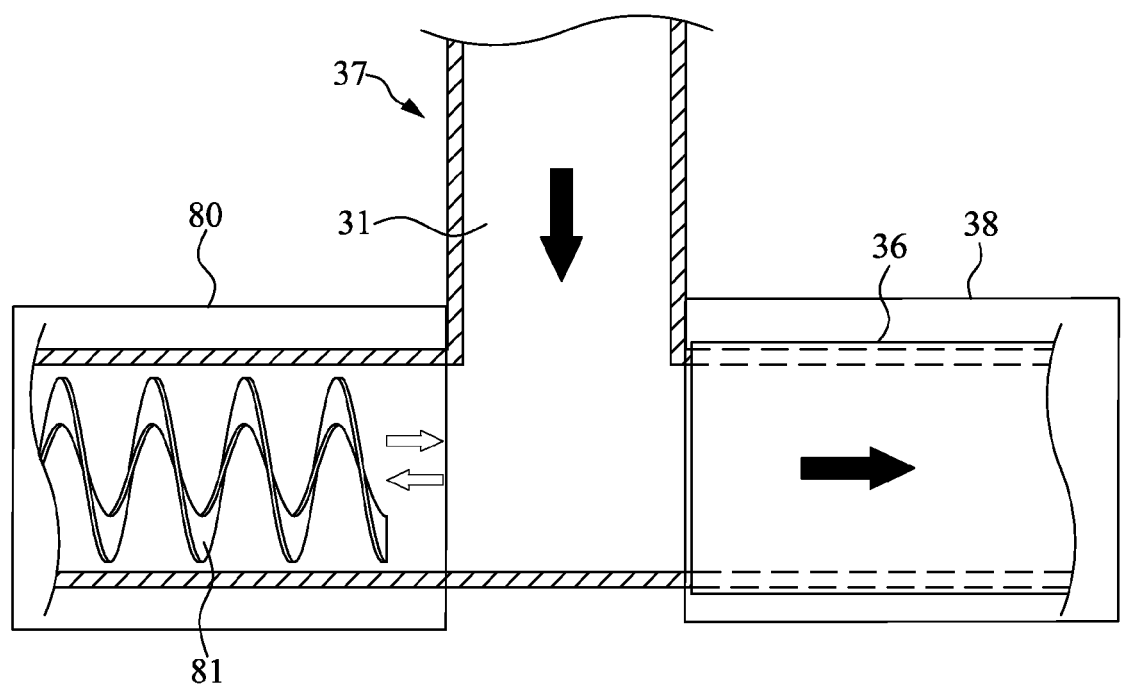
FIG. 4 is a schematic diagram illustrating a screw-shaped rod of the shifting device in accordance with the preferred exemplary embodiment of the present invention.

Referring to FIG. 2 to FIG. 4, in accordance with a preferred exemplary embodiment of the present invention, the intake circulatory system 2 of the zinc air fuel cell of the present invention may be mainly made up of a housing 20, a zinc air cell 30, an air supply system 40, an air collecting system 50, a power supply device 60, a temperature difference engine 70 and a shifting device 80. The housing 20 may be partitioned on the inside so as to form a first space 21 and a second space 22 that is not in connection with the first space 21.

The zinc air cell 30 may be assembled in between the first space 21 and the second space 22 of the housing 20; and the zinc air cell may be mainly made up of a zinc electrode 31, a metal collecting electricity grid 32, an insulating film 33, an air electrode 34, an outer cover 35 as well as a metal mesh 36. The zinc electrode 31 may be positioned at the negative electrode (anode) of the zinc air cell 30, and may be presented in a slurry state that may flow within the first space 21 and the second space 22. The zinc electrode 31 may be encapsulated by the metal collecting electricity grid 32. Furthermore, the metal collecting electricity grid 32 may also be encapsulated by the insulating film 33, the air electrode 34, the outer cover 35 and the metal mesh 36, respectively. The outer cover 35 of the zinc air cell 30 has a plurality of holes 351. The zinc air cell 30 may have a discharging region 37 that is located in the first space 21, and may have a charging region 38 that is located in the second space 22. The metal mesh 36 may be located in the second space 22 of the housing 20.

In one preferred exemplary embodiment of the present invention, the air supply system 40 may have an air supply device 41 and an air intake device 42. The air intake device 42 may have a first air intake pipe 421, a second air intake pipe 422 as well as a third air intake pipe 423. One end of the first air intake pipe 421 may be in connection with the air supply device 41, and the other end of the first air intake pipe 421 may be connected to the second space 22 of the housing 20. The second air intake pipe 422 and the third air intake pipe 423 may be respectively connected to the first air intake pipe 421.

In addition, in one aspect of the present invention, the air collecting system 50 may have an air collecting device 51 that is in connection with the second air intake pipe 422. A first air output pipe 52 may exist in between the air collecting device 51 and the second space 22. Moreover, the power supply device 60 may be assembled on the metal mesh 36 of the zinc air cell 30. In addition, the power supply device 60 may provide and transmit electricity to the metal mesh 36.

A second air output pipe 71 may exist in between the temperature difference engine 70 and a first space 21; the temperature difference engine 70 and the first space 21 may also be in connection with the third air intake pipe 423 of the air intake device 42. The shifting device 80 may be located in between the discharging region 37 and the charging region 38 of the zinc air cell 30. As shown in FIG. 4, the shifting device 80 may be designed as a screw-shaped rod 81.

Figure 5:
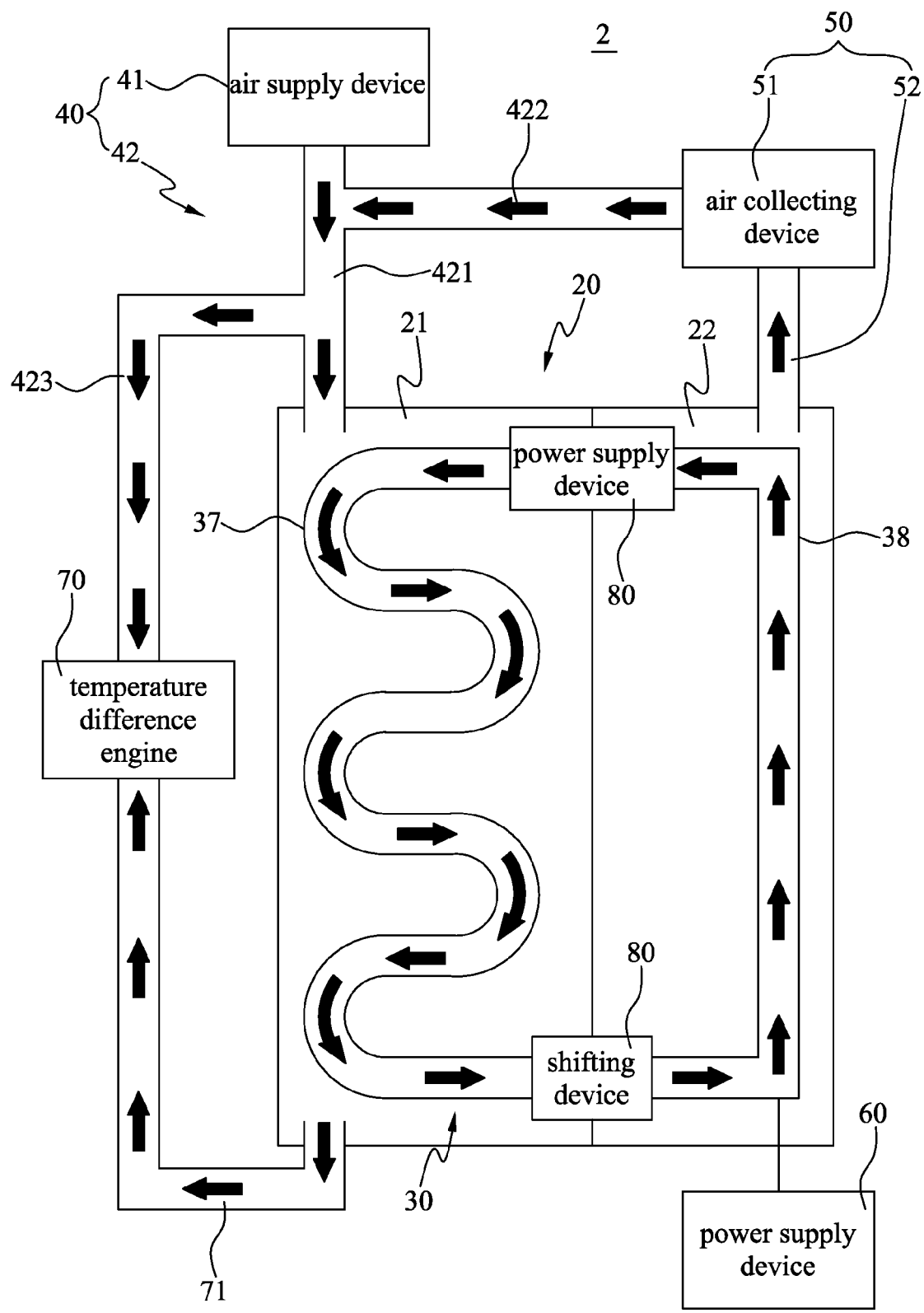
FIG. 5 is a schematic diagram illustrating airflow of the intake circulatory system for a zinc air fuel cell in accordance with the preferred exemplary embodiment of the present invention.

Referring to FIG. 5, while during practical use, the air supply device 41 may absorb external air into its interior. The external air may be transmitted to the first space 21 of the housing 20 via the first air intake pipe 421 of the air intake device 42; the external air may also be transmitted to the temperature difference engine 70 via the third air intake pipe of the air intake device 42. The external air that is within the first space 21 may enter the interior of the zinc air cell 30, via the plurality of through holes 351 on the housing 20, to enable the oxygen from the external air and the zinc electrode 31 of the zinc air cell 30 to have a chemical reaction subsequently and to generate electricity.

In one preferred exemplary embodiment of the present invention, the temperature of the external air that is within the first space 21 may increase by means of a chemical reaction. The external air with the increased temperature may be transmitted to the temperature difference engine 70 via a second air output pipe 71. As such, the temperature difference engine 70 may be driven by a difference in temperature of the external air that passes through the third air intake pipe 423 and the second air output pipe 71.

In accordance with a preferred exemplary embodiment of the present invention, the temperature difference engine may be electrically connected with the air supply device 41, the air collecting device 51, the power supply device 60 as well as the shifting device 80. The aforesaid electrical connections may enable the temperature difference engine 70 to drive the operations of the air supply device 41, the air collecting device 51, the power supply device 60 and the shifting device 80.

In addition, the shifting device 80 may gradually shift the zinc electrode 31 that has already undergone a chemical reaction to the second space 22 of the housing 20, via the first space 21 of the housing 20. Moreover, the power supply 60 may provide and transmit electricity to the metal mesh 36, to enable the zinc electrode 31 that has undergone a chemical reaction to perform a reduction reaction and to produce oxygen in the second space 22. Subsequent to the zinc electrode 31 performing the reduction reaction after passing through the second space 22 of the housing 20, the zinc electrode 31 may also be shifted to the first space 21 by the shifting device 80. This may enable the zinc electrode 31 of the zinc air cell 30 to be able to move back and forth in between the first space 21 and the second space 22 of the housing 20 via the shifting device 80.

In accordance with a preferred exemplary embodiment of the present invention, the air collecting device 51 may transmit the oxygen that is located in the second space 22 to the first air intake pipe 421 of the air intake device 42, via the first air output pipe 52 and the second air intake pipe 422. This may enable the external air and the oxygen to enter and to be mixed in the first space 21, and also enabling the power supply efficiency of the discharging region 37 of the zinc air cell 30 to be significantly increased.

Figure 6:
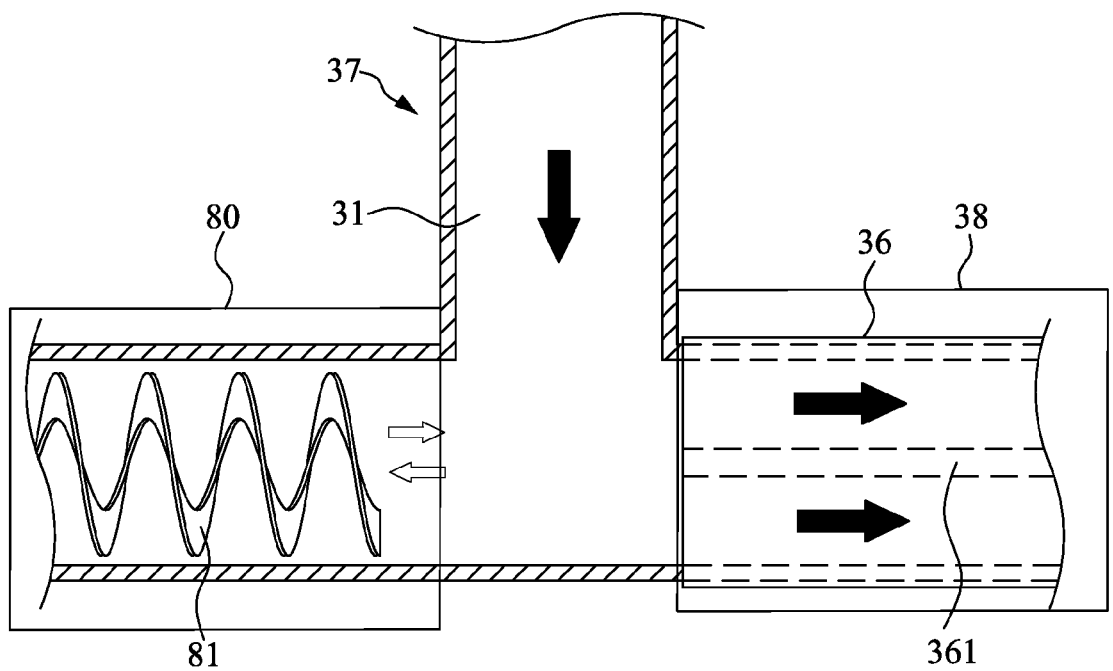
FIG. 6 is a schematic diagram illustrating a hollow metal rod piece inside the zinc air fuel cell in accordance with the preferred exemplary embodiment of the present invention.

Referring to FIG. 6, and in accordance with the second preferred exemplary embodiment of the present invention, the difference of the second preferred exemplary embodiment in comparison with the first preferred exemplary embodiment lies in the fact that the metal mesh 36 may have a hollow metal rod piece 361 that is located inside the zinc air cell 30. When the zinc electrode 31 of the zinc air cell 30 performs the chemical reaction in the first space 21 of the housing 20, the zinc electrode 31 may also be shifted to the second space 22 of the housing 20 by the shifting device 80, in order to perform the reduction reaction. The zinc air cell 30 may produce oxygen by means of a reduction reaction, and the oxygen produced may be transmitted to the second space 22 of the housing 20, via the interior of the hollow metal rod piece 361.

In view of all of the above, the special distinguishing technical feature of the present invention may involve the transmission of external air to the first space of the housing by the air supply device, via the first air intake pipe of the air intake device. This may enable the discharging region of the zinc air cell to have a chemical reaction with oxygen from the external air, and therefore generating electricity. In addition, the power supply device may transmit the electricity to the discharging region of the zinc air cell, to enable the charging region to generate electricity and perform a reduction reaction as well as producing oxygen. The air collecting device may absorb oxygen and may transmit the oxygen to the air intake device, to enable the external air and the oxygen to be mixed and enter the first space, and thus enabling the power supply efficiency of the discharging region to be increased.

Although the preferred exemplary embodiments of the present invention have been described with reference to the preferred exemplary embodiments thereof, it may be apparent to those ordinarily skilled in the art that a variety of modifications and changes may be made without departing from the scope of the present invention which is intended to be defined by the appended claims.

What is claimed is:
1. An intake circulatory system for a zinc air fuel cell, comprising:
  a housing, partitioned on the inside of the intake circulatory system for a zinc air fuel cell to form a first space and a second space;
  a zinc air cell, assembled on the inside of the housing, and comprising a discharging region located in the first space, and a charging region located in the second space;
  an air supply system, comprising an air supply device and an air intake device connected to the air supply device and the first space; and
  an air collecting system, comprising an air collecting device connected to the air intake device, and at least one air output pipe exists in between the air collecting device and the second space;
  wherein the air supply device transmits external air to the first space via the air intake device, the discharging region of the zinc air cell has a chemical reaction with oxygen from the external air to generate electricity, a charging region produces oxygen by generating electricity to perform a reduction reaction, the air collecting device absorbs oxygen and transmits the oxygen to the air intake device, the external air and the oxygen are mixed and enter the first space, and a power supply efficiency of the discharging region is increased.

2. The intake circulatory system for zinc air fuel cell according to claim 1, further comprising a temperature difference engine connected to the air intake device, and at least a second air output pipe exists in between the temperature difference engine and the first space.

3. The intake circulatory system for zinc air fuel cell according to claim 2, wherein the air intake device comprises:
  a first air intake pipe, wherein one end of the first air intake pipe is connected to the air supply device, and the other end of the first air intake pipe is connected to the first space of the housing;
  a second air intake pipe, wherein one end of the second air intake pipe is connected to the first intake pipe, and the other end of the second air intake pipe is connected to the air collecting device; and
  a third air intake pipe, wherein one end of the third air intake pipe is connected to the first intake pipe, and the other end of the third air intake pipe is connected to the temperature difference engine.

4. The intake circulatory system for zinc air fuel cell according to claim 3, wherein the air supply device transmits the external air to the temperature difference engine via the third air intake pipe, the temperature of the external air within the first space increases by means of the chemical reaction, the external air with the increased temperature is transmitted to the temperature difference engine via a second air output pipe, and the temperature difference engine is driven by a difference in temperature of the external air within the third air intake pipe and the external air within the second output pipe.

5. The intake circulatory system for zinc air fuel cell according to claim 1, wherein the zinc air cell comprises:
- a zinc electrode, showing a slurry in a flowable state,
- a metal collecting electricity grid, encapsulating the outside of the zinc electrode;
- an insulating film, encapsulating the outside of the metal collecting electricity grid;
- an air electrode, encapsulating the outside of the insulating film; and
- an outer cover, having a plurality of through holes, and encapsulating the outside of the air electrode.

6. The intake circulatory system for zinc air fuel cell according to claim 5, further comprising a shifting device, wherein the shifting device is assembled in between the charging region and the discharging region of the zinc air cell, and drives the flow of the zinc electrode of the zinc air cell in the metal collecting electricity grid.

7. The intake circulatory system for zinc air fuel cell according to claim 5, wherein the zinc air cell further comprises a metal mesh located on the outside of the outer cover, the metal mesh is located in the second space of the housing, and a power supply device is assembled; and wherein the power supply device supplies and transmits electricity to the metal mesh, and the charging region of the zinc air cell conducts electricity to perform the reduction reaction.

8. The intake circulatory system for zinc air fuel cell according to claim 7, wherein the metal mesh comprises a hollow metal rod piece, the zinc air cell together with the power supply device conduct electricity to perform reduction reaction, and the oxygen produced by the reduction reaction is transmitted to the outside of the zinc air cell via the interior of the hollow metal rod piece.

\* \* \* \* \*